Dec. 15, 1925.
S. W. GREEN
1,565,927
WOODWORKING TOOL AND OPERATING MEANS THEREFOR
Filed Aug. 18, 1925 2 Sheets-Sheet 1
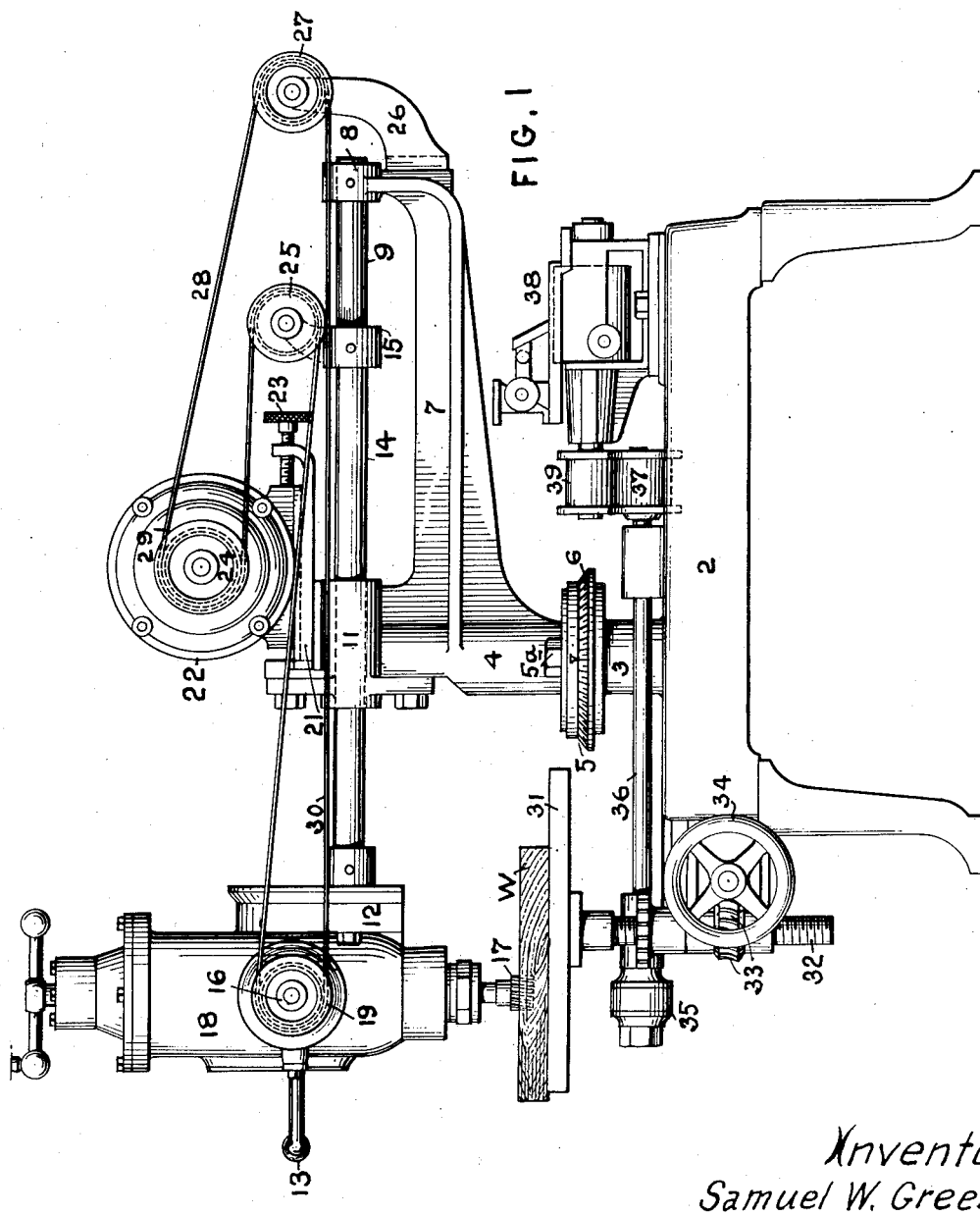
Inventor
Samuel W. Green.
By *signature*
Attorney.

Dec. 15, 1925.
S. W. GREEN
1,565,927
WOODWORKING TOOL AND OPERATING MEANS THEREFOR
Filed Aug. 18, 1925    2 Sheets-Sheet 2
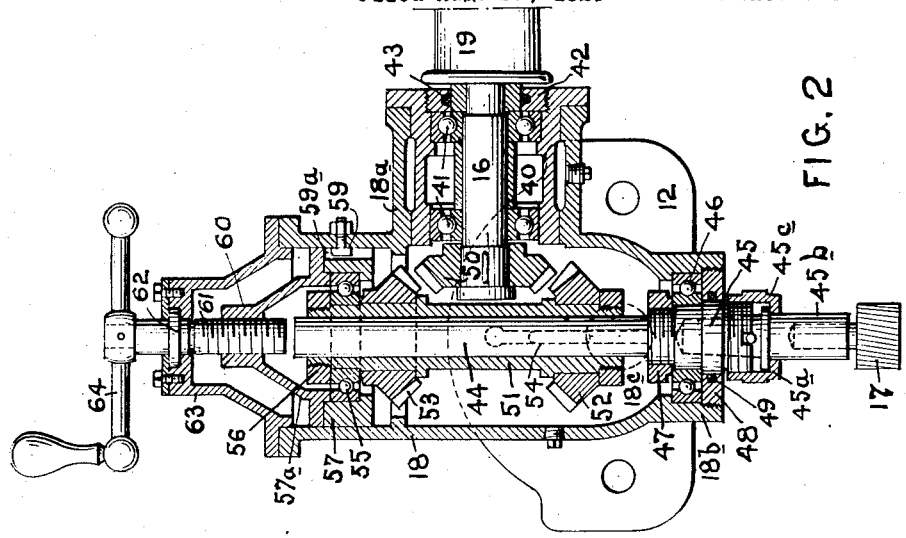
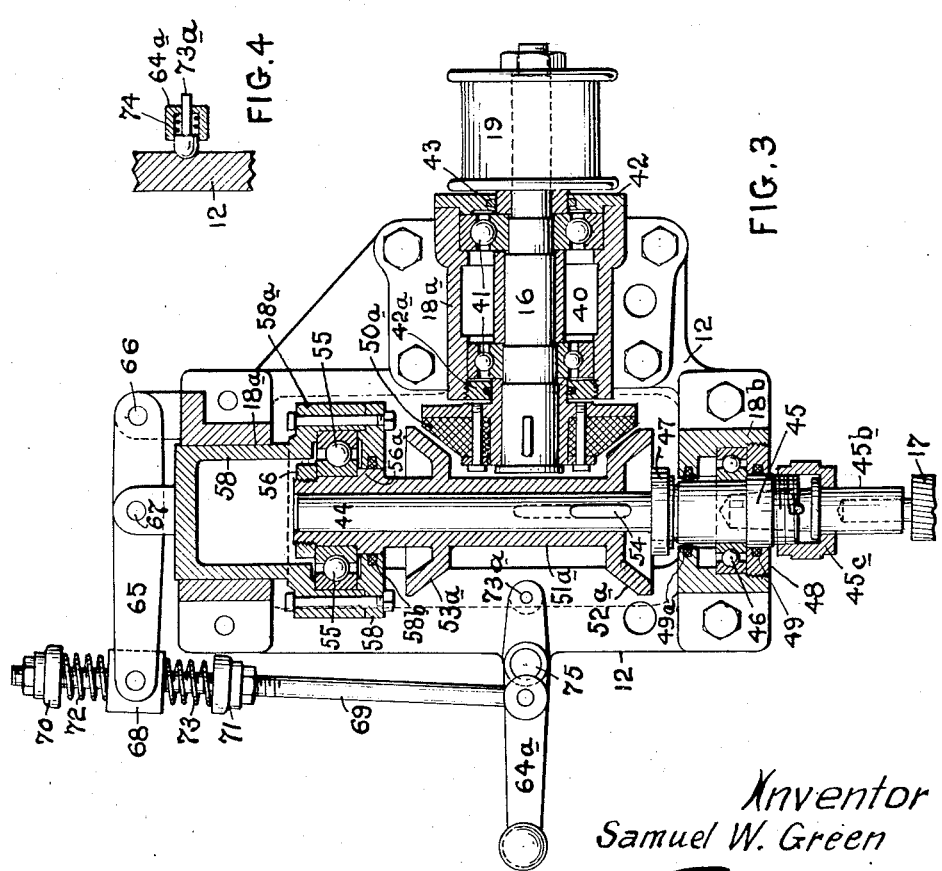
Inventor
Samuel W. Green
By [signature]
Attorney.

Patented Dec. 15, 1925.

1,565,927

UNITED STATES PATENT OFFICE.

SAMUEL W. GREEN, OF GLENSIDE, PENNSYLVANIA.

WOODWORKING TOOL AND OPERATING MEANS THEREFOR.

Application filed August 18, 1925. Serial No. 50,899.

*To all whom it may concern:*

Be it known that I, SAMUEL W. GREEN, a citizen of the United States, and resident of Glenside, county of Montgomery, State of Pennsylvania, have invented an Improvement in Woodworking Tools and Operating Means Therefor, of which the following is a specification.

The object of my invention is to provide a molding cutter suitable to be used with adjustable carrying means whereby it may be moved along definite rectilinear lines radiating from an axis of support about which the cutter may swing.

My object is also to provide means whereby the molding cutter may be caused to reverse its direction of rotation.

A further object of my invention is to provide a vertically adjustable support for the wood to be cut and a downwardly operating molding cutter revolving about a vertical axis and movable horizontally over the work, whereby the actual cutting of the wood may be observed during the cutting operation and a clean cut and removal of the wood to the extreme end of the cut may be assured.

My object is also to provide special improvements in the molding cutter tool whereby its operative cutting parts are held against vertical movement and are adapted for reversal of the cutter without stopping the driving means therefor.

With the above and other objects in view, the nature of which will be more fully understood from the description hereinafter, the invention consists in the novel construction of wood working tool and operating means therefor, as hereinafter more fully described and defined in the claims.

Referring to the drawings: Fig. 1 is a side elevation of a woodworking machine embodying my improvements; Fig. 2 is a vertical section through the molding tool operating means shown in Fig. 1; Fig. 3 is a vertical section through my improved molding tool operating means when adapted for employment of friction drive means instead of clutch teeth as in Fig. 2; and Fig. 4 is a detail for holding the molding cutter out of operation when desired.

While my improved attachment is especially adapted for use with the improved woodworking machine shown, its employment is not restricted in this respect. To make the utility of my improvements more readily understood, I have shown it as attached to a sliding carriage and adapted to be reciprocated relatively to the work and supporting table therefor and will first describe the machine embodying these features.

2 is the main frame or bed frame of the machine and may be of any suitable construction. 3 is an upright pedestal upon which the frame 4 is secured and adjusted with capacity to swing about a vertical axis, the adjustment being permitted by the turntable 5 and the extent of the adjustment being shown by the scale 6 upon one portion of the turn-table and a pointer on the other portion. The adjustable frame 4 may be clamped in any suitable position of adjustment by a clamp 5ª and is provided with a rearwardly extending arm 7 having at its rear end a hub 8 which supports and carries the rear end of a guide arm 9, and said rear end of the frame and guide arm are provided with a bracket 26 upon whose free end is journaled a belt pulley 27. The frame 4 is also provided, on opposite sides of the guide arm 9, with guides 11 for the adjustable carriage 12 which carries the molding tool 17, said guides being on opposite sides of the axis of the frame 4. The carriage 12 is provided at the forward end with a handle 15 by which it may be grasped and shifted back and forth by the operator.

The head 18 of the sliding carriage, containing the direct means for operating the molding cutter 17 and for reversing its rotation, is provided with a horizontal operating or driving shaft 16, the same being journaled in ball bearings 41 and having secured on its outer end a belt pulley 19. It will be further seen that the carriage also comprises two rearwardly extending rods 14 slidable through the guides 11 on the adjustable frame, said rods being secured at their rear ends in a transverse frame 15 which is guided upon the rearwardly extending guide arm 9. The frame 15 is extended to one side and carries thereat the pulley 25. It will be seen that the carriage is guided in the guides 11 adjacent to the vertical axis of the frame 4, and also upon the rear end of the guide arm 9, so that it has widely separated points of guiding support.

Secured to the upper part of the adjustable frame 4, adjacent to the vertical axis thereof, is a motor support 21 upon which an electric motor 22 is placed and adjustable horizontally by the adjusting devices 23. The weight of this motor is, therefore, supported close to the axis of the adjustable frame 4 and any vibration, due to the motor, is transmitted to the base portions of the machine instead of to the sliding carriage. The electric motor 22 is provided with a driving belt wheel 24; and said belt wheel 24 pulleys 19, 25 and 27 are all in substantially the same vertical plane with the belt 28, as will be understood by reference to Fig. 1.

The belt 28, at one end, passes about the belt wheel 24 of the motor, as at 29, and at the other end, about the belt wheel 19 on the driving shaft 16 of the head 18 as at 30, and the intermediate portions of the belt are looped about the pulleys 25 and 27, as clearly shown in Fig. 1. The tension of the belt may be assured by the tension adjusting devices 23 which permit reasonable adjustment of the motor upon its support 21.

It will now be seen that as the carriage 12 is moved to the left, the pulleys 19 and 25 move with it, and as they both move to the same extent, the additional belt length required to bridge the distance between the pulleys 19 and 27 is provided by the corresponding changes in the distance between the driving pulley 24 and pulley 25 on the carriage, thereby insuring the belt remaining at the same tension for all movements of the carriage and, moreover, allowing the carriage to be shifted without in any manner affecting the real transmission of power from the motor to the molding or cutting tool.

In connection with the capacity for movement of the carriage, it will be noted that the pulley 25 bears a relation to the pulleys 24 and 19, such that the belt length from the pulley 24 to the pulley 25, and from the pulley 19 to the pulley 27 are substantially parallel and are also parallel to the guide 9 for the carriage and, therefore, no amount of adjustment of the latter will materially affect the tension of the belt, so that the transmission is very efficient and at the same time capable of transmitting the power required without undue loss by friction.

31 is a table for supporting the material W to be operated upon, said table being adjustable vertically relatively to the main frame of the machine and the rip-saw on mandrel 36 when used, by means of supporting screws 32 and worm wheel gearing 33, operated by hand wheel 34. Any other suitable manner of supporting and adjusting the table 31 may be employed, if so desired, and I in no wise restrict myself in this respect.

It will now be understood that the molding tool 17 may operate upon the material W resting upon the table and by proper adjustment of the adjustable frame 4, the dado or other cut may be produced at right angles, or at any other angle to the length of the material as desired; and the depth of the cut may be insured by the proper vertical adjustment of the table.

Referring more specifically to the mechanism of the dado or molding head 18 and cutter 17, the same will be readily understood by reference to Figs. 2, 3 and 4. As before stated, the horizontal driving or operating shaft 16 is supported in ball bearings 41 carried by a removable hollow bushing 40 which may also act as an oil reservoir. A secondary bushing ring 42 carrying a felt or other suitable packing 43 may be employed to prevent oil leaking outwardly and also for preventing dirt getting into the bearings. As shown, the secondary bushing 42 is screwed into the tubular bushing 40 and is removable with it. At the inner end of the shaft 16 there is keyed a driving bevel gear 50 as in Fig. 2, or a bevel friction wheel 50ª as in Fig. 3. Referring first to Fig. 2, the casing of the head 18 is provided with a vertical shaft 44, the lower end of which is made with a socket portion 45 formed with a bearing part having an integral annular collar 45ª and an adjustable clamping collar 47 screwed upon the shaft and adapted to clamp one member of the ball bearing 46 between it and the collar 45ª. The other member of the ball bearing 46 is clamped in position in the lower end of the case 18 between the annular shoulder 18ᵇ and a removable bushing 48 also fitting into and secured to the lower end of the casing, said bushing further provided with an annular packing 49 to prevent the escape of oil from the interior of the case. 45ᵇ represents an extension shank piece which is formed with a socket for the shank of the cutting tool 17 and itself detachably fitting in the socket of the lower end of the shaft 44, and may be held in place by the clamping nut 45ᶜ. A sleeve 51 fits upon the vertical shaft 44 with provision for a sliding movement vertically, but splined to the shaft at 54 to insure positive rotation with it. At the lower end of this sleeve is secured a bevel gear 52 and at or near its top the sleeve is provided with a similar bevel gear 53, but the gears 52 and 53 point in opposite directions so as to enable each gear to be separately made to engage the bevel gear 50 on the driving shaft 16. One member of a ball bearing 55 is clamped to the upper end of the sleeve 51 by the screw collar 56. The other member of this ball bearing 55 is clamped between parts 57 and 57ª so as to move with them, these parts being guided for vertical adjustment upon and within the casing 18. A screw 61 is threaded into the hub 60 of part 57ª and is adapted to raise or lower said part, a spline 59 engaging a slot 59ª in the frame 18 preventing it from rotating during adjustment. This screw 61 is provided with a collar 62 journaled in the upper part 63 of the casing and has a hand crank 64 whereby it may be rotated. When the parts 57 and 57ª are raised or lowered by the screw 61, they carry with them the ball bearing 55 and also the sleeve 51 with its bevel gears 52 and 53.

It will be understood that when the parts are adjusted as shown in Fig. 2, the shaft 16 may be driven by the belt and no rotation be given to the cutter 17. If now, the crank 64 is rotated in one direction, the upper gear will be meshed with gear 50 and the cutter shaft 44 with cutter 17 will be rotated in one direction as in cutting the dado; whereas, if the crank 64 is rotated in the opposite direction, the upper gear 53 will be moved out of contact with gear 50 and the lower gear 52 will be raised to engage gear 50. The adjustment of the gears is preferably made before the driving motor and belt are put into action, to guard against stripping the teeth. The lower end of the case 18 may be formed as a reservoir 18ᶜ to retain oil so that the bearing 46 may run in oil, though I do not restrict myself in this respect.

Referring now to the construction shown in Figs. 3 and 4, it will be observed that while the same general organization of parts are employed as in Fig. 2, the toothed gears are substituted by beveled friction wheels. The construction of the horizontal driving shaft 16 is provided with the belt pulley 19 and journaled in ball bearings 41 as before. The inner end of this shaft is, however, provided with a beveled fibre friction wheel. The tubular bushing 40 of Fig. 2 is omitted and the ball bearings supported by the casing 18ª. Furthermore, in this case, I employ a bushing 42ª with a packing at the inner end of the rotating shaft member 16 as well as to its outer end shown at 42. This precaution is to prevent oil from the chamber 40 escaping into the friction wheel space where it is not needed. The vertical shaft 44 is provided with a spline 54 to cause the sleeve 51ª to rotate with it and is supported at the bottom in a ball bearing in all material respects, as in Fig. 2, except that in this case I also employ an annular packing 49ª above the ball bearing 46 as well as below it at 49, whereby the oil for the bearing is retained and not contaminated by refuse or dirt working into it. It will also be noted that the shaft 44 at its socket end 45 is journaled not only in the ball bearing, but also substantially so below it at 48 and above it adjacent to the packing 49ª, and being held against downward movement by the bushing 48. The sleeve 51ª slides vertically upon the shaft 44 and is provided with a beveled friction wheel 52ª at the bottom and a similar friction wheel 53ª at the top, said friction wheels being respectively brought into operative contact with the friction drive wheel 50ª according as to whether the sleeve is moved upward or downward upon its shaft. The upper end of the sleeve is journaled by a ball bearing 55 in the vertically adjustable head 58ª, the oil being retained in the ball bearing by use of an annular plate 58ᶜ having the packing 58ᵇ and mechanically holding the ball bearing in operable position. The inner annular ring member of the ball bearing is clamped against an annular shoulder 56ª on the sleeve by the clamping nut or collar 56. The head 58ª is extended upward in the guide 58 which is guided in the fixed frame at 18ª and hence the sleeve and its friction wheels will be moved up or down according as part 58 is moved up or down. A lever 65, fulcrumed at 66, is connected at 67 with the part 58. The free end of lever 65 is hinged to a collar 68 through which a rod 69 slides and about the rod immediately adjacent to the respective ends of the collar are springs 72 and 73, said springs retained in operative position by collars 70 and 71 fixedly secured to the rod. The lower end of the rod is hinged to a hand lever 64ª pivoted to the head 12 at 75 and having a heel extension provided with a friction detent 73ª operating against the face of the head 12 under the action of a spring 74 (Fig. 4), for the purpose of holding the parts normally as shown in Fig. 3 and with the friction wheels 52ª and 53ª out of contact with friction drive wheel 50ª. When the hand lever 64ª is moved upward, the friction wheel 52ª is put into driven contact with friction wheel 50ª, so that the cutter shaft 44 is rotated in one direction; and when said lever is moved downward then friction wheel 53ª is put into driven contact with friction wheel 50ª, so that the cutter shaft 44 is rotated in the opposite direction. The springs 72 and 73 enable a yielding pressure to be applied. When in operation, the extent of friction may be increased to any extent desired to insure proper cutting. It is manifest that a screw adjusting means, as in Fig. 2, may be employed if so desired, but its operation would not be as effective as that shown in Fig. 3 unless a spring action to yieldingly maintain driving contact was employed.

The cutting tool may be adapted to the vertical shaft in Fig. 3, in the same way in which it is shown in Fig. 2, or in any other suitable manner.

The special advantage of a tool attachment of the character herein set out resides in the fact that in cutting grooves or dadoes, such as in stair horses, the groove may be cut at the blind end in a finished condition and obviate the necessity of hand operations such as has heretofore been necessary to remove the wood left in the groove by the vertically rotating large dado cutters and which revolve in a plane at right angles to the plane of rotation of the cutters 17 of this present invention.

While a casing is not required over the friction wheels, such a casing may be provided as indicated in dotted lines and constitutes a shield as in Fig. 2.

In the preferred application of my improved tool, I employ it in connection with a slidable carriage as before stated, the carriage being a part of a well organized wood-working machine of the character set out in my application Serial No. 653,080, filed July 23, 1923. As such machine is also provided with a rip-saw shaft 36 having a saw carrying head 35 and operating pulley 37 and likewise with a jointer 38 having an operating pulley 39, with which pulleys the endless belt 28 is adapted to engage after temporary disengagement with the pulley 19 of the cross-cut saw and adjustment of the carriage carrying frame 4 to bring the pulleys 37 and 39 in alinement with the pulleys 24, 25 and 27, I have shown such equipment in connection with the present invention since said parts cooperate in preparing the wood of the shape and finish required before cutting the grooves or dado therein.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I desire to secure by Letters Patent is:

1. In a woodworking machine, the combination of the main frame and a support for the material to be cut, with an adjustable frame supported by the main frame and adjustable about a vertical axis with respect to the main frame, a sliding carriage guided upon the adjustable frame whereby it may be reciprocated thereon, a molding cutter rotating upon a vertical axis having a horizontal driving shaft therefor all journaled in the forward end of the sliding carriage, said driving shaft provided with a belt wheel, guide pulleys respectively secured to the rear end of the carriage and to the adjustable frame, a motor supported by the adjustable frame independently of the sliding carriage and operating a driving pulley, and a belt having one end looped about the driving pulley of the motor and the other end looped about the pulley on the driving shaft of the molding cutter and the intermediate parts of the belt respectively looped about a pulley at the rear of the carriage and a pulley upon the adjustable frame, whereby the carriage and its cutter may be freely moved relatively to the adjustable frame while maintaining a constant power transmitting connection between the driving pulley and the pulley on the molding cutter.

2. In a woodworking machine, the combination with the main frame and table for holding the material to be operated upon, of an adjustable frame movable about a vertical axis, a horizontally reciprocable carriage guided upon and movable with said adjustable frame, a molding cutter supported by and movable with the carriage and rotatable about a vertical axis, said cutter having a driving shaft journaled on and transversely of the carriage whereby the molding cutter revolves in a plane about a vertical axis at right angles to the line of movement of the carriage, a motor supported independently of the carriage, and power transmission means between said motor and the holding cutter which permits free reciprocation of the carriage while maintaining the power transmitting connection with the molding cutter thereon.

3. The invention according to claim 2, wherein further, manually controlled means are provided between the molding cutter and power transmission means for causing the cutter to be rotated in reversed directions.

4. The invention according to claim 2, wherein further, a friction driving means is interposed between the driving shaft and molding cutter, and manually operable means are provided for controlling the extent of the friction utilized in the friction driving means.

5. The invention according to claim 2, wherein further, manually controlled means are interposed between the molding cutter and the power transmission means for putting the molding cutter into and out of operation without interfering with the continuous operation of the motor.

6. In a woodworking machine, the combination of a vertically adjustable table upon which the material to be operated on is placed, with a reciprocable sliding carriage freely movable transversely of said table under manual pressure and provided with a molding cutter movable with it and rotatable about a vertical axis, means for driving the cutter while permitting the carriage and cutter being shifted over the table consisting of a shaft on the carriage at right angles to the vertical axis of the cutter and provided with a pulley, a motor independent of the carriage, and compensating belt transmission means between the motor and pulley on the cutter operating shaft.

7. The invention according to claim 6, wherein further, manually controlled means are provided between the molding cutter and compensating belt transmission means for causing the cutter to be rotated in reversed directions.

8. The invention according to claim 6, wherein further, a friction driving means is interposed between the driving shaft and molding cutter, and manually operable means are provided for controlling the extent of the friction utilized in the friction driving means.

9. The invention according to claim 6, wherein further, the carriage is furnished with a head having a horizontal driving shaft provided on one end with a belt pulley and on the other end with a friction wheel and the head also having a vertical shaft provided at the bottom with a socket for the molding tool and at its upper part with a sliding sleeve through which the shaft extends said sleeve having a friction wheel for engagement with the friction wheel on the horizontal shaft, and manually controlled means for shifting the sleeve and putting the friction wheels into and out of contact, to start or stop the rotation of the molding cutter and without interference with the belt transmission means and motor.

10. In a woodworking machine, a head for detachable connection to a support and carrying a molding cutter and comprising a vertical shaft journaled at its lower end in the head and provided with a socket for the cutting tool, combined with a vertically sliding sleeve mounted on the vertical shaft and splined thereto so as to rotate with it, a journal bearing at the upper end of the sleeve, manually operable means for adjusting the last mentioned bearing vertically on the head for adjusting the sleeve upon the vertical shaft, a horizontal driving shaft journaled in the head at right angles to the vertical shaft, and a mechanical connection between the horizontal shaft and sleeve adapted to couple or uncouple them in respect to driving relation under control of the vertical adjustment of the sleeve.

11. The invention according to claim 10, wherein further, the mechanical connection between the horizontal shaft and sleeve consists of two friction wheels, one on the sleeve and the other on the horizontal shaft.

12. The invention according to claim 10, wherein further, the mechanical connection between the horizontal shaft and sleeve consists of a bevel friction wheel on the horizontal driving shaft and oppositely directed beveled friction wheel surfaces secured to the sleeve and respectively above and below the first mentioned bevel friction wheel and normally out of contact therewith, and further, in which the manually operable means is adapted to move the beveled friction wheel surfaces of the sleeve alternately into contact with the beveled wheel of the horizontal shaft for reversing the rotation of the tool carrying vertical shaft.

13. The invention according to claim 10, wherein further, the journal of the horizontal driving shaft comprises widely separated ball bearings and annular packing means outside of the ball bearings to prevent escape of oil and also providing a large oil space between the bearings and surrounding the shaft.

14. The invention according to claim 10, wherein further, the means for vertically adjusting the sleeve consists of an annular frame to which the outer member of the bearing is secured, said frame guided in the head to move vertically, and hand operable means on the head for shifting the said frame vertically with a yielding pressure.

In testimony of which invention, I hereunto set my hand.

SAMUEL W. GREEN.